United States Patent
McDonald et al.

(10) Patent No.: US 11,853,739 B2
(45) Date of Patent: Dec. 26, 2023

(54) AUTOMATED ENDPOINT PRODUCT MANAGEMENT

(71) Applicant: Ivanti, Inc., South Jordan, UT (US)

(72) Inventors: Sean McDonald, Saint Paul, MN (US); Johnathan Gohde, Arden Hills, MN (US); Jaremie Romer, Saint Paul, MN (US)

(73) Assignee: Ivanti, Inc., South Jordan, UT (US)

( * ) Notice: Subject to any disclaimer, the term of this patent is extended or adjusted under 35 U.S.C. 154(b) by 56 days.

(21) Appl. No.: 17/508,748

(22) Filed: Oct. 22, 2021

(65) Prior Publication Data
US 2022/0129260 A1    Apr. 28, 2022

Related U.S. Application Data

(60) Provisional application No. 63/104,407, filed on Oct. 22, 2020, provisional application No. 63/113,390, filed on Nov. 13, 2020.

(51) Int. Cl.
*G06F 9/445*    (2018.01)
*G06F 8/65*    (2018.01)
*G06F 8/70*    (2018.01)

(52) U.S. Cl.
CPC . *G06F 8/65* (2013.01); *G06F 8/70* (2013.01)

(58) Field of Classification Search
CPC . G06F 8/65; G06F 8/70; G06F 16/164; G06F 11/004; G06F 11/362
USPC .................................................. 717/168–178
See application file for complete search history.

(56) References Cited

U.S. PATENT DOCUMENTS 8,832,175 B2 *   9/2014   du Preez ............. H04L 61/5014
                                                         709/201

* cited by examiner

*Primary Examiner* — Chuck O Kendall

(57) ABSTRACT

A method of automated software management includes importing update metadata consumed from an update list describing cybersecurity vulnerabilities and product updates. Based on the update metadata, the method includes generating an initial update list including outstanding product updates for endpoints included in a managed network. The method includes discovering products of an endpoint of the managed network. Based on discovered products, the method includes generating an endpoint-specific inventory including product metadata of the products loaded on the endpoint. The method includes identifying an unnecessary product update of the outstanding product updates not related to the discovered products. The method includes filtering the unnecessary product update from the initial update list to generate a modified update list including a subset of outstanding product updates and omitting the unnecessary product update. The method includes distributing only the subset of outstanding product updates of the modified update list to the managed endpoint.

20 Claims, 10 Drawing Sheets

Recommended Updates

Software Installed on Endpoints 620

| Product Name 676 | Publisher 678 | Version 680 |
|---|---|---|
| First Product 676A | First Publisher 678A | 5.00.8913.1000 680A |
| Second Program 676B | First Publisher 678A | 10.4.0.0 680B |
| Third Program 676C | Second Publisher 678B | 5.0.785.1604 680C |

Recommended Updates 632

| Bulletin 666 | Product Name 676 | Publisher 678 | Security 672 |
|---|---|---|---|
| First Bulletin 666A | First Program 676A | First Publisher 678A | Unspecified |
| Second Bulletin 666B | Second Program 676B | First Publisher 678A | Severe |
| Third Bulletin 666C | Third Program 676C | Second Publisher 678B | Critical |

Create Smart Filter 674

FIG. 6

AUTOMATED ENDPOINT PRODUCT MANAGEMENT

CROSS-REFERENCE TO RELATED APPLICATIONS

This application claims benefit of and priority to U.S. Provisional Application Nos. 63/104,407, filed Oct. 22, 2020, and 63/113,390, filed Nov. 13, 2020. The disclosures of these provisional applications are incorporated herein by reference in their entireties.

FIELD

The embodiments described in this disclosure are related to automated endpoint product management, and in particular to product management using product inventories of managed endpoints.

BACKGROUND

In enterprise and other managed networks, an endpoint refers to a computing device that is integrated into the network and that is in communication with a management device. The management device may include a server device, for instance that has visibility to operating parameters and state parameters of the endpoints. Based on information communicated between the management device and the endpoints, the management device may detect issues at the endpoints, deploy solutions to the endpoints, update software on the endpoints, troubleshoot issues at the endpoints, provision roles and security controls to the endpoints, etc.

One element of the managed networks is coordination and distribution of product updates. Sometimes this operation is referred to as patch management. The updates or patches generally include code changes to products on the managed endpoints or some subset thereof. The products that are updated include software applications, software tools, operating systems, and the like. Distribution of the updates is important to ensure the products are properly functioning and to ensure cybersecurity vulnerabilities are addressed.

In some circumstances, a vendor publicizes the updates that are relevant to its products. Publication of the updates is an ongoing process. For instance, MICROSOFT® has traditionally released software patches on "Patch Tuesday" which occurs on the second and sometimes the fourth Tuesday of each month. In addition, software patches might be released and published responsive to detection of a specific vulnerability. Following publication of the software patches, administrators of the managed networks may access and distribute the product updates.

The managed networks sometimes include one or more endpoints that are not entirely controlled by an administrator of the managed network. For instance, some managed networks may support a bring your own device (BYOD) environment or may include an extensive network of devices and users having distinct roles. The managed network that supports the BYOD environment may allow a user or an employee to use a personal endpoint. Accordingly, the products loaded on the personal endpoint may not be known or controlled by the administrator of the managed network. Similarly, an extensive network may include endpoints that require different and non-standard product inventories.

In these and other managed networks, it is difficult to properly and efficiently manage updates. For example, there may be a mismatch between the product updates that are relevant in the managed network and the product updates that are actually distributed to endpoints in the managed network. Accordingly, some products may persist in an un-patched or out-of-date state because the recommended product updates are not distributed. Additionally, product updates distributed to the endpoints may not apply to any product at the managed endpoint. Distribution of unnecessary product updates decreases available bandwidth in managed networks. Additionally, storage and maintenance of the unnecessary product updates consume computing storage resources and computing processing resources. Accordingly, there is a need to improve the product update management systems and processes.

The subject matter claimed herein is not limited to embodiments that solve any disadvantages or that operate only in environments such as those described. Rather, this background is only provided to illustrate one example technology area where some embodiments described herein may be practiced.

SUMMARY

According to an aspect of the invention, an embodiment includes a method of automated software management. The method includes importing update metadata consumed from an update list describing cybersecurity vulnerabilities and product updates. Based on the update metadata, the method includes generating an initial update list including outstanding product updates for endpoints included in a managed network. The method includes discovering products of an endpoint of the managed network. Based on discovered products, the method includes generating an endpoint-specific inventory including product metadata of the products loaded on the endpoint. The method includes identifying an unnecessary product update of the outstanding product updates not related to the discovered products. The method includes filtering the unnecessary product update from the initial update list to generate a modified update list including a subset of outstanding product updates and omitting the unnecessary product update. The method includes distributing only the subset of outstanding product updates of the modified update list to the managed endpoint.

According to another aspect of the invention, an embodiment includes a method of automated software management. The method may include automated software management of a managed endpoints included in a managed network. The method may include importing update metadata. The update metadata may be consumed from an update list. The update list may describe cybersecurity vulnerabilities and product updates. Based on the imported update metadata, the method may include generating an initial update list. The initial update list may include outstanding product updates for managed endpoints included in a managed network. The method may include discovering products that are loaded on a managed endpoint of the multiple managed endpoints. Based on discovered products, the method may include generating an endpoint-specific inventory. The endpoint-specific inventory may include product metadata of the products loaded on the managed endpoint. The method may include identifying an unnecessary product update. The unnecessary product update may include one of the outstanding product updates that is not related to at least one of the discovered products. The method may include filtering the unnecessary product update from the initial update list. Filtering the unnecessary product generates a modified update list. The modified update list may include a subset of the outstanding product updates and omit the unnecessary product update. The method may include distributing only the subset of outstanding product updates of the modified update list to the managed endpoint.

A further aspect of an embodiment may include non-transitory computer-readable medium having encoded therein programming code executable by one or more processors to perform or control performance of one or more of the operations of the methods of automated software management described above.

An additional aspect of an embodiment may include compute device comprising one or more processors and a non-transitory computer-readable medium having encoded therein programming code executable by one or more processors to perform or control performance of one or more of the operations of the methods of automated software management described above.

The object and advantages of the embodiments will be realized and achieved at least by the elements, features, and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which:

FIG. 6 depicts an example recommended update user interface that may be implemented in the automated software management process of FIG. 2;

DESCRIPTION OF SOME EXAMPLE EMBODIMENTS

The embodiments described in this disclosure are related to automated endpoint product management. Some embodiments provide endpoint product management using accessed product inventories of managed endpoints.

The embodiments of the present disclosure address technical problems that exist in conventional patch management systems. For instance, in some conventional managed networks, product update or patch management is conducted without knowledge of products implemented at managed endpoints. For instance, in some networks, users are allowed to download and use products without expressed approval from or oversight by an administrator. Accordingly, in these conventional management systems, patches may be distributed to endpoints for products that are not currently loaded on the endpoint. Additionally, the management system may overlook and fail to distribute patches that apply to the endpoints. These conventional management systems suffer from persistence of vulnerabilities at the endpoints and inefficient vulnerability management.

Some embodiments of the present disclosure address this technical problem. For instance, embodiments include systems and processes that discover the products or metadata of the products at managed endpoints. An inventory of products at the endpoint are generated based on discovered products. The inventory is used to filter product updates that do not relate to products on the endpoints. Additionally, in some embodiments, the inventory may be used to evaluate a status of the products and to identify previous product updates that have not been implemented on the endpoints. The previous product updates may include product updates that are were missed or otherwise not implemented in the products when they were released by vendors. For instance, the previous product updates may have been released months or years ago and not implemented in the products.

These and other embodiments are described with reference to the appended Figures in which like item number indicates like function and structure unless described otherwise. The configurations of the present systems and methods, as generally described and illustrated in the Figures herein, may be arranged and designed in different configurations. Thus, the following detailed description of the Figures, is not intended to limit the scope of the systems and methods, as claimed, but is merely representative of example configurations of the systems and methods.

Figure 1:
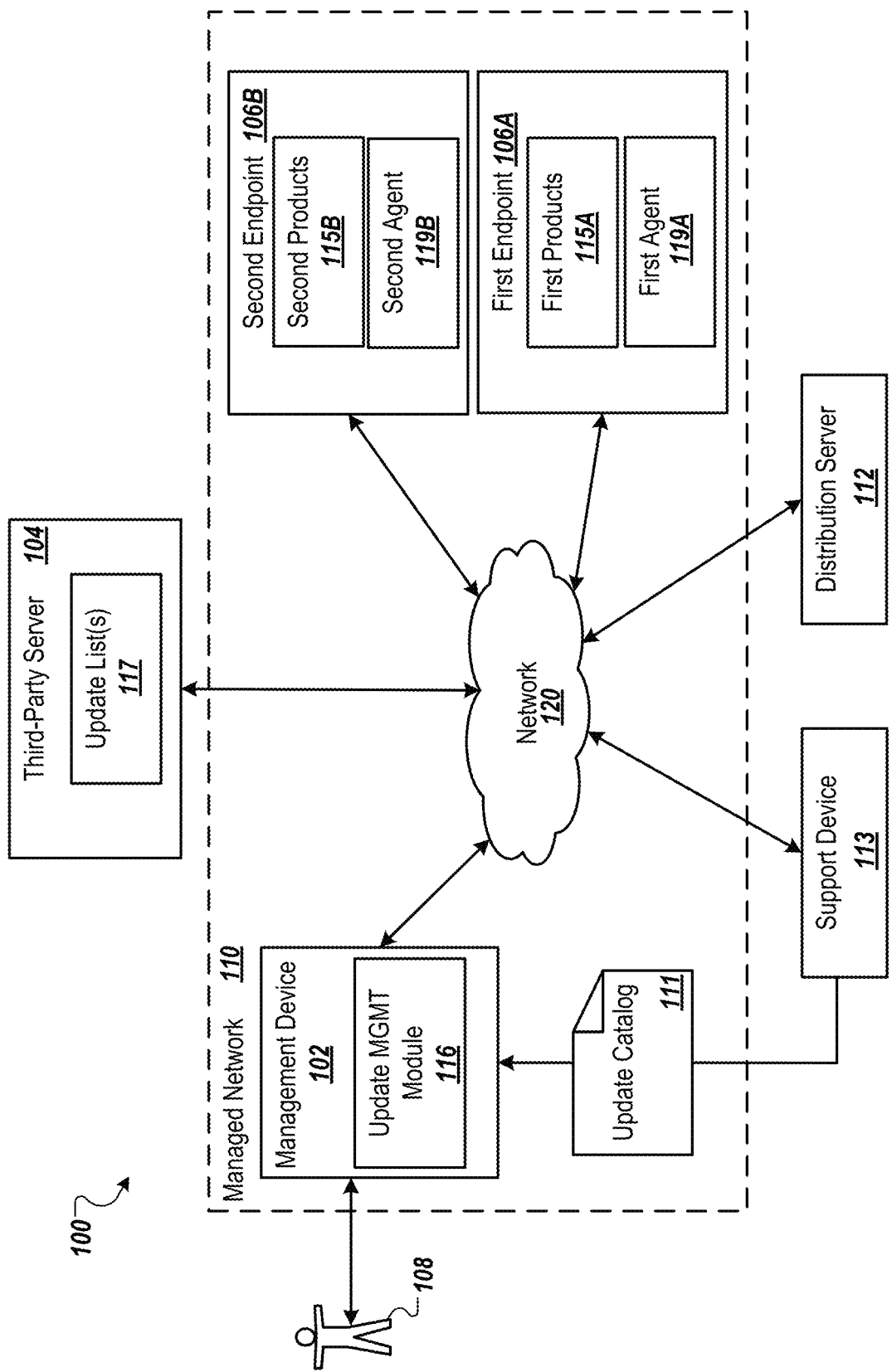
FIG. 1 depicts a block diagram of an example operating environment in some embodiments described in the present disclosure may be implemented.

FIG. 1 is a block diagram of an example operating environment 100 in which some embodiments of the present invention can be implemented. The operating environment 100 may be configured for implementation of product update management in a managed network 110. The product update management may enable product updates such as software patches and code changes to be accessed, consumed, and distributed to endpoints 106A and 106B (generally, endpoint 106 or endpoints 106) of the managed network 110. In the managed network 110, one or more product update management operations may be based on product inventories of the endpoints 106. The product inventories may ensure that product updates distributed to the endpoints 106 by the management device 102 are specific and apply to products loaded on the endpoints 106. Use of the product inventories prevent or reduce distribution of product updates that are not related to any of the products of the endpoints 106. Moreover, the product inventories of the endpoints 106 may be used to ensure products of the endpoints 106 are up-to-date or current. For instance, after the product inventory is generated, a status of one or more of the products may be determined. Responsive to a product being out-of-date, one or more previous product updates may be distributed to the endpoints 106 to bring the product up-to-date.

Embodiments of the present disclosure provide a technical improvement to conventional patch management systems. For instance, in some conventional patch management systems, endpoints are managed using published product updates. An administrator may review the public product updates and publish outstanding product updates that have not been implemented at the endpoints such that these outstanding product updates may be distributed to endpoints. The administrator in the conventional patch management systems does not have visibility regarding the products at the endpoints. Instead, the administrator is conducting a review based on a perceived and incomplete knowledge of which products have been deployed in the managed network. For instance, the administrator may not know that a particular set of endpoints have installed a particular application or changed to another operating system. Thus, these conventional patch management systems may suffer from inefficiencies resulting from this incomplete knowledge regarding the products at the endpoints.

For instance, one or more of the outstanding product updates may not apply to any products at the endpoints. These outstanding product updates may be reviewed by the administrator and distributed. Because these recommended product updates are not incorporated into any products at the endpoints, technical and computing resources allocated to the outstanding product updates are wasted. Similarly, because the products at the endpoints are not known, the outstanding product updates may not include patches that are relevant to the products on the endpoints. Thus, these products may persist in an out-of-date or unpatched state.

Some embodiments of the present disclosure improve conventional patch management systems and address the inefficiencies and technical issues described above. For instance, some embodiments of the management device 102 access and use products of the endpoints 106. The management device 102 generates product inventories that may be specific to the one or both of the endpoints 106. The product inventories may be used to filter outstanding product updates made available by vendors. Thus, product updates distributed to the endpoints 106 may not include product updates that are not related to a product on the endpoints 106. Additionally, the product inventories may be used to ensure products on the endpoints 106 are up-to-date or current.

Accordingly, embodiments of the present disclosure are directed to a computer-centric problem and are implemented in a computer-centric environment. For instance, the embodiments of the present disclosure are directed to product update management in the managed network 110. Computing processes occurring in the operating environment 100 include communication and implementation of product updates that include software patches and code changes on products loaded on the endpoints 106. Communications during the processes described in this present disclosure involve the communication of data in electronic and optical forms via a network 120 and also involve the electrical and optical interpretation of the data and information.

Furthermore, the embodiments of the present disclosure address a technical issue that exists in a technical environment. The technical issue includes an inability of conventional patch management systems to manage product updates based on products at the endpoints 106 and the inefficiencies that result therefrom. The technical problem is solved through a technical solution. For instance, the technical solution involves discovery of products at the endpoints 106 and filtering outstanding product updates based on the discovered products. Additionally, statuses of discovered products might be evaluated by the management device 102. The management device 102 may identify one or more product updates that have not been installed at the endpoints 106 and distribute those product updates to the endpoints 106.

The operating environment 100 may include the managed network 110, a third-party server 104, a support device 113, and a distribution server 112. The managed network 110 includes the management device 102 that may communicate with the third-party server 104, the support device 113, the endpoints 106, and the distribution server 112 via the network 120. The components of the operating environment 100 are configured to communicate data and information via the network 120 to perform automated endpoint product management as described in the present disclosure. Each of these components are described below.

The network 120 may include any communication network configured for communication of signals between the components (e.g., 102, 113, 108, 112, 104, and 106) of the operating environment 100. The network 120 may be wired or wireless. The network 120 may have configurations including a star configuration, a token ring configuration, or another suitable configuration. Furthermore, the network 120 may include a local area network (LAN), a wide area network (WAN) (e.g., the Internet), and/or other interconnected data paths across which multiple devices may communicate. In some embodiments, the network 120 may include a peer-to-peer network. The network 120 may also be coupled to or include portions of a telecommunications network that may enable communication of data in a variety of different communication protocols.

In some embodiments, the network 120 includes or is configured to include a BLUETOOTH® communication network, a Z-Wave® communication network, an Insteon® communication network, an EnOcean® communication network, a Wi-Fi communication network, a ZigBee communication network, a representative state transfer application protocol interface (REST API) communication network, an extensible messaging and presence protocol (XMPP) communication network, a cellular communications network, any similar communication networks, or any combination thereof for sending and receiving data. The data communicated in the network 120 may include data communicated via short messaging service (SMS), multimedia messaging service (MMS), hypertext transfer protocol (HTTP), direct data connection, wireless application protocol (WAP), or any other protocol that may be implemented in the components of the operating environment 100.

The third-party server 104 includes a hardware-based computer device or collection thereof that is configured to communicate with the other components of the operating environment 100 via the network 120. The third-party server 104 is configured to provide access to one or more update lists 117, portions thereof, and information pertaining to entries of the update lists 117. For instance, the third-party server 104 may host a website on which the update lists 117 are available. The third-party server 104 may host or store the update lists 117 such that information, metadata, and data related to entries on the update lists 117 may be accessed via the network 120. For instance, the management device 102 or the support device 113 may be configured to access the update lists 117 or information related to entries on the update lists 117 via the network 120. In some embodiments, the management device 102 or the support device 113 may be configured to communicate an electronic message to the third-party server 104 that accesses the update lists 117, information (e.g., update metadata) related to entries on the update lists 117, or a specific portion of the update lists 117. Some examples of example APIs for accessing the update lists 117 are available at https://www-.circl.lu/services/cve-search/.

The update lists 117 may include a list of entries. The entries relate to a cybersecurity threat, a cybersecurity vulnerability, a software application code change, a patch, a hardware interface modification, or another update to a product. The entries have information related to the entries.

For instance, one or more of the entries may include an identification number, an entry date, an entry summary, a links to product updates (e.g., a code change or patch), a threat severity, or some combination thereof.

An example of the third-party server 104 may be Department of Homeland Security (DHS) server(s). In this example, the update lists 117 may include lists of common vulnerabilities and exposures (CVEs) hosted by the DHS servers. Another example of the third-party server 104 may be National Institute of Standards and Technology (NIST) servers. In this example, the update lists 117 may include national vulnerability database that is hosted by the NIST servers. The NIST server may host the information assurance vulnerability alerts (IAVAs), which may an example of the update lists 117. One with skill in the art may be familiar with other suitable examples of the third-party server 104 and the update lists 117. Lists of vulnerabilities and threats are maintained by some additional entities such as MITRE.

The depicted embodiment of the operating environment 100 includes the support device 113. The support device 113 may be a hardware-based computer device configured to communicate data and information with the other components of the operating environment 100 via the network 120. In embodiments that include the support device 113, the update lists 117 may be consumed at the support device to generate an update catalog 111. The update catalog 111 includes records and information related to previous product updates. As the update lists 117 become available, update metadata or other information maybe appended to the update catalog 111.

The support device 113 may communicate the update catalog 111 to the management device 102 or may otherwise make available the update catalog 111. For instance, the support device 113 may also communicate the update catalog 111 to a separate host that is connected to the network 120. The update catalog 111 may be accessed from the separate host and stored on a suitable storage medium. The management device 102 may then access the update catalog 111 from the storage medium.

The update catalog 111 may be stored at least temporarily at the management device 102. In other instances, the update catalog 111 may be stored remotely and accessed by the management device 102 via the network 120. In FIG. 1, the update catalog 111 is depicted as being communicated outside the network 120. In some embodiments, the update catalog 111 may be communicated or accessed via the network 120.

In some embodiments, the operating environment 100 may not include the support device 113. In these embodiments, the management device 102 might directly consume information of the update lists 117.

The depicted embodiment of the operating environment 100 includes the distribution server 112. The distribution server 112 may be a hardware-based server configured to communicate data and information with the other components of the operating environment 100 via the network 120. The distribution server 112 may be configured to store published product updates or instructions related to published product updates. For example, in some embodiments, the management device 102 may communicate one or more product updates to the distribution server 112. One or both of the endpoints 106 may then access the product updates at the distribution server 112. After the product updates are accessed, the product updates may be implemented at one or both of the endpoints 106 to modify code of one of the products 115A or 115B on the endpoints 106. An example of the distribution server 112 may include a Windows® Server Update Services (WSUS) server.

In the depicted embodiment, the distribution server 112 is not included in the managed network 110. In some embodiments, the distribution server 112 may be included in the managed network 110. For instance, in some embodiments in which the distribution server 112 includes the WSUS server, it may be included in the managed network 110.

In some embodiments, the operating environment 100 may omit the distribution server 112. Additionally or alternatively, the distribution server 112 may be used for a portion of product updates and not used for another portion of the product updates.

The managed network 110 includes the management device 102 and the endpoints 106. The managed network 110 is implemented to enable management of the endpoints 106 by the management device 102. To implement the managed network 110, the endpoints 106 may be enrolled. After the endpoints 106 are enrolled, ongoing management of the endpoints 106 may be implemented by the management device 102. The ongoing management may include overseeing and dictating at least a part of the operations at the endpoints 106 as well as dictate or control product updates implemented at the endpoints 106 as described in the present disclosure.

The management device 102 is configured to manage product updates at the endpoints 106. In general, management of the product updates may include determining which product updates pertain to product(s) 115A and 115B (collectively, products 115), to determine which of the product updates to distribute to the endpoints 106, and to distribute the product updates to the endpoints 106 such that the product updates may be locally implemented. Implementation of the product updates at the endpoints 106 include modification to computer code, programming code, or computer-executable instructions of a program that comprise the products 115.

The endpoints 106 may include hardware-based computer systems that are configured to communicate with the other components of the operating environment 100 via the network 120. The endpoints 106 may include any computer device that may be managed by the management device 102 and/or have been enrolled in the managed network 110. Generally, the endpoints 106 include devices that are operated by the personnel and systems of an enterprise or store data of the enterprise. The endpoints 106 might include workstations of an enterprise, servers, data storage systems, printers, telephones, internet of things (IOT) devices, smart watches, sensors, automobiles, battery charging devices, scanner devices, etc. The endpoints 106 may also include virtual machines, which may include a portion of a single processing unit or one or more portions of multiple processing units, which may be included in multiple machines. The endpoints 106 may be referred to as managed endpoints when the endpoints 106 are included in the managed network 110.

The endpoints 106 include the products 115 and an agent 119A or 119B. For instance, in the depicted embodiment, a first endpoint 106A may include first products 115A and a first agent 119A and a second endpoint 106B may include second products 115B and a second agent 119B. The first and second agents 119A and 119B are generally referred to as agent 119 or agents 119 and the first products 115A and the second products 115B are generally referred to as products 115 or products 115.

The agents 119 may be locally installed at least temporarily on the endpoints 106. For instance, the agents 119 may be installed on the endpoints 106 when the endpoints 106 are enrolled in the managed network 110 or when a particular service is loaded at the endpoints 106. The agents 119 may have access to information related to the products 115 and may be configured to communicate the information such as product metadata related to the products 115 to the management device 102. For instance, the first agent 119A may have access to information related to the first products 115A. On its own or responsive to a request (from the management device 102 or another endpoint 106), the first agent 119A may communicate the information related to the first products 115A to the management device 102. The information related to the first products 115A may include a current inventory of the first products 115A as well as information or product metadata related to the first products 115A such as version, vendor, type, hardware integrations, size, privacy policy, software interfaces, and the like. The agents 119 may also implement administrative and/or management processes within the managed network 110.

The products 115 may include applications of any kind or type. Some examples of the products 115 may include software applications, enterprise software, operating systems, and the like. The first products 115A may not be the same as the second products 115B. For instance, the first products 115A may include a first set of software applications while the second products 115B may include a second set of software applications which may include at least one software application that is not included in the first set of software applications.

The management device 102 may include a hardware-based computer system that is configured to communicate with the other components of the operating environment 100 via the network 120. The management device 102 may be associated with an administrator 108. The administrator 108 may be an individual, a set of individuals, or a system that interfaces with the management device 102. In some embodiments, the administrator 108 may be provide input to the management device 102. The input provided by the administrator 108 may form the basis of some computing processes performed by the management device 102. For example, the administrator 108 may provide user input at a user interface associated with the management device 102. The user input may indicate that the administrator 108 intends on publishing a subset of recommended product updates. The user input may take the form of a selection of an icon or button on the management device 102.

The management device 102 may include an update management module 116 (in the Figures, "update MGMT module"). The update management module 116 may be configured for automated software management of the endpoints 106 of the managed network 110. The automated software management may be based on discovery of the products 115 and improved management based on the discovered products 115.

For example, in some embodiments, the update management module 116 may be configured to import update metadata. The update metadata may be consumed from the update lists 117 or may be received as part of an update catalog 111. As described above, the update lists 117 may include cybersecurity vulnerabilities and product updates, which may be related to or pertain to the products 115.

The update management module 116 may generate an initial update list based on the imported update metadata. The initial update list may include one or more outstanding product updates for the endpoints 106. For example, the imported update metadata or the update catalog 111 might include ten entries of recent cybersecurity vulnerabilities and product updates. Responsive to receipt of the imported update metadata, the update management module 116 may generate the initial update list to include product updates related to each of the ten entries.

In some embodiments, the update management module 116 may be configured to import and use vulnerability information related to CVEs, IAVAs, or another suitable update list 117. For instance, the update management module 116 may identify the products that are related to the vulnerability information. The update management module 116 may then use the identified products to at least partially generate the initial update list. For example, the update management module 116 may review the update catalog 111 to find product updates related to the identified products. The found product updates may then be included (e.g., appended to) in the initial update list. Additionally or alternatively, the found product updates may also be used to filter or prioritize the initial update list. In these and other embodiment, the initial update list also be based directly on information of the update catalog 111 without referencing the vulnerability information or may be solely based on the information related to vulnerability information.

The update management module 116 may be configured to discover the products 115 at the endpoints 106. In some embodiments, the update management module 116 may communicate with the agent 119 to discover the products 115. For instance, the agent 119 may be configured to generate a report. The report may include information related to the products 115. The report may then be communicated to the update management module 116. The information related to the products 115 might include application-metadata (e.g., name, vendor, version, etc.) or other suitable identifying information of the products 115.

The report communicated by the agent 119 in these and other embodiments may provide some advantages over some conventional systems in which a scan is performed of the endpoint 106. For instance, scans may be limited to a specific type or a specific format of information (e.g., an exact binary file) known about the products 115. The limited knowledge regarding the products 115 may further limit an ability to determine suitable product updates for the products 115. In the embodiments described in the present disclosure, the report provided by the agent 119 includes the application-metadata, which is a broader set of information relative to a binary file, etc. Accordingly, the information provided in the report may be used to accurately identify applicable product updates in the update catalog 111.

The update management module 116 may generate an endpoint-specific inventory. The endpoint-specific inventory may be based on the discovered products and/or the information related to the products 115. The endpoint-specific inventory may include the products 115 loaded on the endpoints 106. In some embodiments, the endpoint-specific inventory may relate to one of the endpoints 106 (e.g., may include the first products 115A on the first endpoint 106A). Additionally or alternatively, the endpoint-specific inventory may relate to two or more endpoints 106, which may be a defined group of endpoints 106. For example, the endpoint-specific inventory may include common products 115 in the endpoints 106. Other formats may be implemented for the product-specific inventory to relate the products 115 or subsets thereof that are loaded on the endpoints 106.

The update management module 116 may identify an unnecessary product update from the initial update list. The unnecessary product update is one of the outstanding product updates that does not relate to at least one of the discovered products.

The update management module 116 may filter the unnecessary product update from the initial update list. Filtering the unnecessary product update from the initial update list may remove the unnecessary product update from the initial update list. Filtering the unnecessary product update may generate a modified update list. The modified update list may include a subset of the outstanding product updates and may omit the unnecessary product update. The subset of the outstanding product updates may be presented as "recommended updates" in some embodiments.

The update management module 116 may distribute the subset of outstanding product updates of the modified update list to the endpoint 106. In some embodiments, the endpoints 106 may access the subset of outstanding product updates at the management device 102 or at the distribution server 112. Additionally or alternatively, the management device 102 may communicate the subset of outstanding product updates to the endpoint 106. The outstanding product updates may be received at the endpoints 106 and may be incorporated into one or more of the products 115. For instance, the subset of outstanding product updates may modify the program codes of one or more of the products 115.

The update management module 116 may be further configured to maintain and actively manage updates related to products 115 on the endpoints 106. For instance, the update management module 116 may rediscover the products 115 on the endpoints 106. When the products 115 are rediscovered, the update management module 116 may determine whether there has been changes to the products 115. Responsive to a change (e.g., an additional product or a removed product), the modified update list may be further modified to either add additional product updates or filter product updates consistent with the products 115 on the endpoints 106.

In addition, the update management module 116 may analyze a status of one or more of the products 115. For example, after the update management module 116 generates the endpoint-specific inventory, the update management module 116 may determine the status of one of the products 115. The status of the product 115 may include "out-of-date," which may indicate that a version of the product 115 is an older version or a vulnerability of the product 115 has not been addressed. The status of the product 115 may alternatively include "current" or "up-to-date," which indicates that the product 115 at the endpoint 106 is the most current version.

Responsive to detection of the product 115 that is out-of-date, the update management module 116 may determine the one or more previous product updates necessary to bring the status to "current" or "up-to-date" status. The update management module 116 may distribute the one or more previous product updates to the endpoint 106 where the previous product updates are implemented.

The agent 119, the update management module 116, the products 115, and components thereof may be implemented using hardware including a processor, a microprocessor (e.g., to perform or control performance of one or more operations), a field-programmable gate array (FPGA), or an application-specific integrated circuit (ASIC). In some other instances, the agent 119, the update management module 116, the products 115, and components thereof may be implemented using a combination of hardware and software. Implementation in software may include rapid activation and deactivation of one or more transistors or transistor elements such as may be included in hardware of a computing system (e.g., the endpoints 106 or the management device 102 of FIG. 1). Additionally, software defined instructions may operate on information within transistor elements. Implementation of software instructions may at least temporarily reconfigure electronic pathways and transform computing hardware.

The managed network 110 may be associated with an enterprise, a portion of an enterprise, a government entity, or another entity or set of devices (102, 113, 106, or 112). In some embodiments, the management device 102 may be a single server, a set of servers, a virtual device, or a virtual server in a cloud-base network of servers. In these and other embodiments, the update management module 116 may be spread over two or more cores, which may be virtualized across multiple physical machines.

Modifications, additions, or omissions may be made to the operating environment 100 without departing from the scope of the present disclosure. For example, the operating environment 100 may include one or more managed networks 110, one or more management devices 102, one or more support devices 113, one or more endpoints 106, one or more third-party servers 104, one or more distribution servers 112, or any combination thereof. Moreover, the separation of various components and devices in the embodiments described herein is not meant to indicate that the separation occurs in all embodiments. Moreover, it may be understood with the benefit of this disclosure that the described components and servers may generally be integrated together in a single component or server or separated into multiple components or servers.

Figure 2:
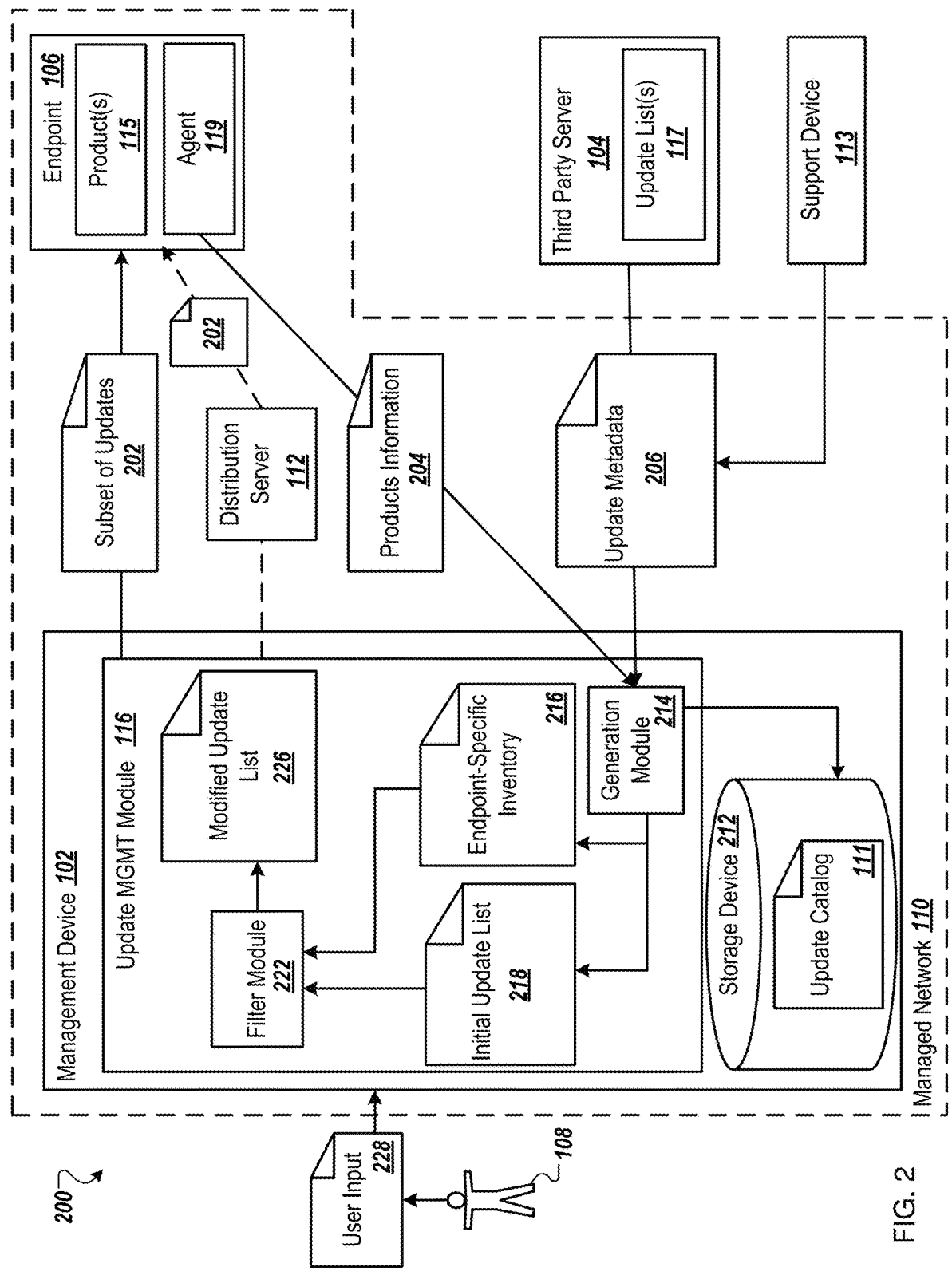
FIG. 2 depicts a block diagram of an example automated software management process that may be implemented in the operating environment of FIG. 1.

FIG. 2 depicts a block diagram of an example automated software management process (management process) 200 that may be implemented in the operating environment of FIG. 1 or another suitable environment. The management process 200 of FIG. 2 may include one or more components (102, 104, 106, 108, 110, 111, 112, 113, 117, 115, 116, and 119) described with reference to FIG. 1. Although not depicted in FIG. 2, communication in the management process 200 may be via a network such as the network 120 of FIG. 1.

In the management process 200, update metadata 206 may be imported by the management device 102. The update metadata 206 may be imported from one or both of the third-party server 104 and the support device 113. For instance, third-party server 104 may be a server of an entity that publishes bulletins including the update metadata 206. The management device 102 may download the update metadata 206 from the third-party server 104. Additionally or alternatively, the support device 113 may review the bulletins of the third-party server 104. Based on the review, administrators of the support device 113 may communicate the update metadata 206 to the management device 102 or include the update metadata 206 in an update catalog 111.

The update metadata 206 may include data that describes characteristics of one or more product updates. For instance, the update metadata 206 may include an identifier or name of the product updates, dates of the bulletins, security level of the product updates, urgency of the product updates, threat level of the product updates, vendors of the product updates, applicable programs of the product updates, combinations thereof, or other data describing characteristics of the product updates.

The update metadata 206 may be processed by the update management module 116. For instance, the update metadata 206 or some portion thereof may be entered into a data storage architecture (e.g., the storage device 212), which may make the update metadata 206 accessible to the administrator 108. The update metadata 206 may include vulnerability information that is related to known vulnerabilities.

For instance, the update metadata 206 may include vulnerability information from CVEs, IAVAs, etc.

After the import of the update metadata 206, a generation module 214 of the update management module 116 may generate an initial update list 218. The initial update list 218 includes outstanding product updates that are identified in the update metadata 206. In some embodiments, the initial update list 218 might include all or substantially the outstanding product updates that are related the managed network 110. Additionally or alternatively, the initial update list 218 may include product updates that are relevant to products to which CVEs IAVAs, or other published vulnerabilities pertain. For instance, the generation module 214 may identify the products that are related to the CVEs (or IAVAs or another suitable list of vulnerabilities). The generation module 214 may identify product updates from the update catalog 111 that are relevant to the identified products. The generation module 214 may generate the initial update list 218 based at least partially on these product updates.

The initial update list 218 may be displayed to the administrator 108 in some embodiments. Display of the initial update list 218 may provide some patch management insight, which may be valuable to the administrator 108. Additionally, the initial update list 218 may be communicated to a filter module 222 and may represent an overly inclusive list of product updates that may or may not be related to the products 115 of the managed network 110.

The generation module 214 may be configured to discover products 115 at the endpoint 106. With combined reference to FIGS. 1 and 2, the generation module 214 may be configured to discover products 115 on each or all of the endpoints 106 of the managed network 110. In some embodiments, the generation module 214 may be implemented as part of a larger management applications. For instance, the discovery operation may be performed as part of an endpoint management process implemented in the managed network 110. The endpoint management process may interface with the agents 119 at the endpoints 106.

Referring back to FIG. 2, the generation module 214 may be configured to communicate with the agent 119 of the endpoint 106. The agent 119 may access and track information related to the products 115 on the endpoint 106. The agent 119 may communicate products information 204 regarding the products 115 loaded on the endpoint 106. The products information 204 may indicate the current products 115 loaded on the endpoints 106. For instance, if a user of the endpoint 106 downloaded an application without permission or authorization of the administrator 108, the discovery operation may uncover the presence of the application on the endpoint 106. In some embodiments, the generation module 214 may perform a discovery operation responsive to receipt of the update metadata 206. Additionally or alternatively, the generation module 214 implement the discovery operation periodically or according to a schedule (e.g., every day or every week).

The generation module 214 may be configured to generate an endpoint-specific inventory 216. The endpoint-specific inventory 216 may be generated based on the product information 204. The endpoint-specific inventory 216 includes generally provides information related to the products 115 on the endpoint 106. For instance, the endpoint-specific inventory 216 may include a product name, a version, a vendor, and the like.

In some embodiments, the endpoint-specific inventory 216 may include an inventory of two or more endpoints 106. In particular, the endpoint-specific inventory 216 may include the inventory of a group of endpoints or a subnet of the managed network 110. The endpoint-specific inventory 216 may be communicated to the filter module 222.

The filter module 222 may be configured to identify an unnecessary product update in the initial update list 218. The unnecessary product update may include one of the outstanding product updates of the initial update list 218 that is not related to at least one of the discovered products of the endpoint-specific inventory 216. In some embodiments, the filter module 222 may base the identification of the unnecessary product update on a comparison of data and information in the initial update list 218 with the data and information in the endpoint-specific inventory 216. For instance, the initial update list 218 might include three (3) product updates that are related to a first product, a second product, and a third product. The endpoint-specific inventory may list the products 115 of the endpoint 106 to include the first product and the third product. Accordingly, the filter might identify that the product update related to the second product is unnecessary.

The filter module 222 may filter the unnecessary product update from the initial update list 218. By filtering the unnecessary product update, the filter module 222 may generate a modified update list 226. The modified update list 226 may include a subset of the outstanding product updates of the initial update list 218 and may omit the unnecessary product updates.

The update management module 116 may be configured to distribute a subset of outstanding product updates (hereinafter, "subset of updates") 202 to the endpoint 106 or otherwise take actions to communicate the subset of updates 202 to the endpoint 106. As described elsewhere in the present disclosure, in some embodiments, the distribution may communicate the subset of updates 202 indirectly to the endpoint 106. For instance, the subset of updates 202 may be published to the distribution server 112. The endpoint 106 may then access the subset of updates 202 from the distribution server 112.

The update management module 116 may communicate the subset of updates 202 for implementation at the endpoint 106. Implementation of the subset of updates 202 may include code changes that are executed or incorporated at the product 115. The distributed update 202 modifies a portion of a code that makes up the application such that at least one functionality of the application changes following implementation.

The distribution may include only the subset of updates 202. For example, the unnecessary product updates may not be distributed. Accordingly, implementation of the management process 200 may improve the efficiency of patch management in the managed network 110.

In some embodiments, distributing only the subset of outstanding product updates occurs automatically. For instance, the update management module 116 may automatically distribute and/or publish the subset of updates 202. The update management module 116 may automatically distribute and/or publish the subset of updates 202 to the distribution server 112 for instance. The update management module 116 may automatically distribute and/or publish the subset of updates 202 responsive to indications of matches between the product updates in the initial update list 218 and products in the endpoint-specific inventory 216.

Additionally or alternatively, the update management module 116 may be configured to manually publish and distribute the subset of updates 202. For instance, the update management module 116 may be configured to cause display of the modified update list 226 in a user interface. An example of the user interface is described with reference to FIG. 5.

The user interface may be configured to receive user input 228. For instance, the user interface may include an icon or electronic button configured to receive the user input 228 and in response distribute the subset of updates 202. As described elsewhere in the present disclosure, distribution (manual and automatic) may include publication to the distribution server.

The management process 200 or some operations included therein may be implemented for two or more endpoints 106. The management process 200 may be implemented individually for each endpoint 106 or may be implemented for a group of endpoints 106. The update management module 116 may discover the products 115 of each endpoint 106 or each group of endpoints 106. The product updates (e.g., the subset of update 202) applicable to the discovered products may be distributed.

The management process 200 may be repeated. For instance, each time a bulletin is published or the update catalog 111 is updated, the management process 200 may be performed. Additionally, the management process 200 may be performed when the managed network 110 is changed. For instance, the management process 200 may be performed responsive to one or more added endpoints 106, one or more removed endpoints 106, one or more changed products 115, reconfiguring groups of endpoints 106, and the like.

Figure 3:
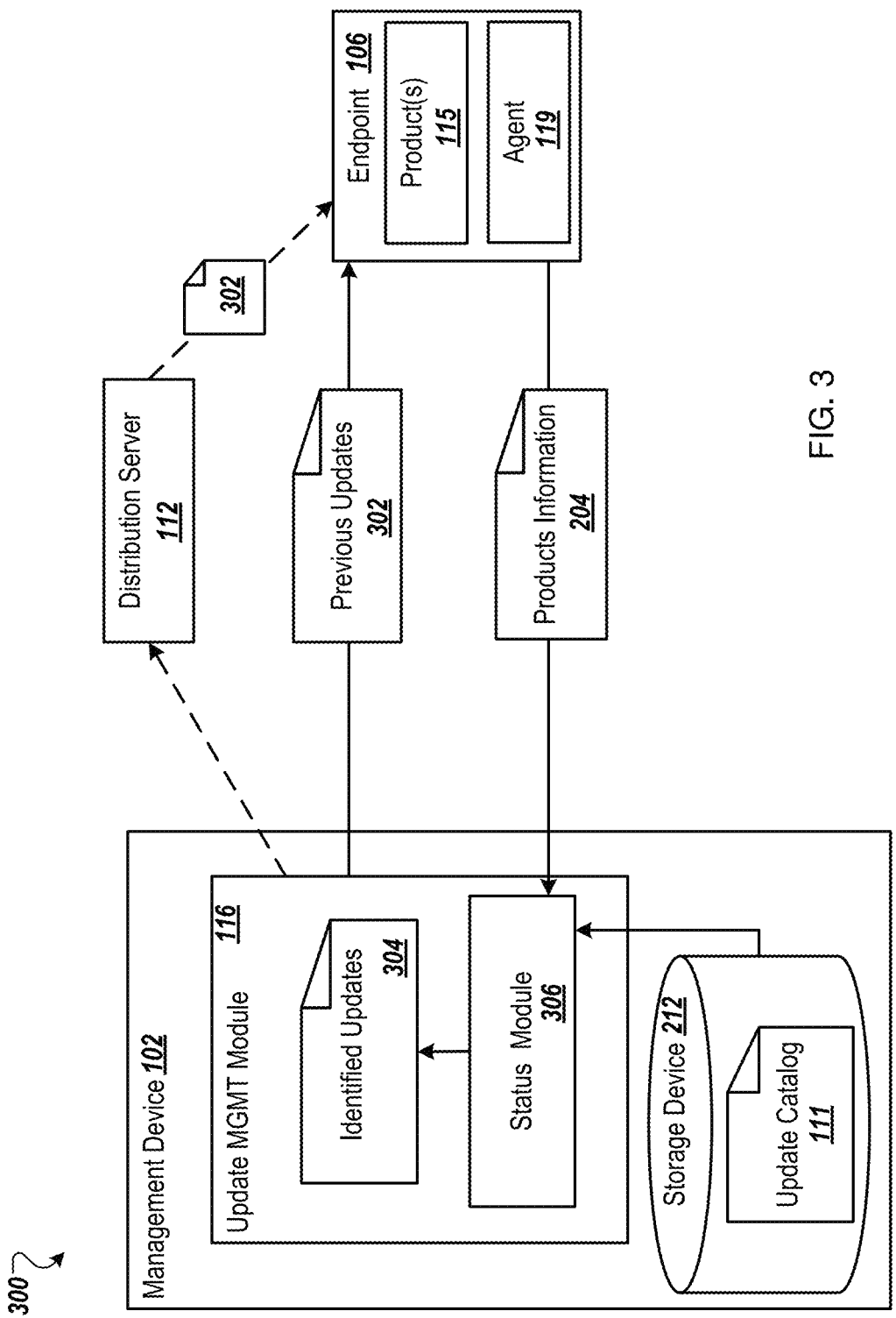
FIG. 3 depicts a block diagram of an example product analysis process that may be implemented in the operating environment of FIG. 1.

FIG. 3 depicts a block diagram of an example product analysis process (analysis process) 300 that may be implemented in the operating environment of FIG. 1 or another suitable environment. The analysis process 300 of FIG. 3 may include one or more components (102, 106, 111, 112, 115, 116, and 119) described with reference to FIGS. 1 and 2. Although not depicted in FIG. 3, communication in the analysis process 300 may be via a network such as the network 120 of FIG. 1.

The analysis process 300 may be configured to identify a status of updates and patches in the products 115 in the endpoint 106. Additionally, responsive to identification of an out-of-date product, the analysis process 300 may include performing one or more operations to correct deficiencies. For instance, the analysis operation may include distribution of past patches or updates that bring the product 115 to an up-to-date or current status.

The analysis process 300 may be performed by the management device 102 described with reference to FIGS. 1 and 2. The management device 102 may include or may have access to a storage device 212. The storage device 212 may include any type of memory (e.g., 712 of FIG. 7). The update catalog 111 may be stored on the storage device 212. In some embodiments, the storage device 212 or a portion thereof may be stored remotely to the management device 102. In these and other embodiments, the update management module 116 may access the update catalog 111 via a network.

The update management module 116 may be further configured to access the products information 204 described elsewhere in the present disclosure. Based on the update catalog 111, update management module 116 may determine whether the products 115 of the discovered products is out-of-date. For instance, the update management module 116 may determine a current version of the product 115 at the endpoint 106. The update management module 116 may review past product updates of the update catalog 111 that are related to the products 115. The update management module 116 may then determine whether the current version of the product 115 at the endpoint incorporates the applicable updates in the update catalog 111. If the current version of the product 115 at the endpoint 106 does not incorporate the applicable updates from the catalog 111, then the product 115 is determined to be out-of-date. If the current version of the product 115 at the endpoint does incorporate the applicable updates, then the product 115 is determined to be up-to-date or current.

Responsive to the product 115 being out-of-date, the update management module 116 may be configured to identify one or more previous product updates (in FIG. 3, "identified updates") 304. The previous product updates 304 may be identified from the update catalog 111 that have not been installed at the endpoint 106. The update management module 116 may be configured to distribute the previous updates 302 or a portion thereof to the endpoint 106. Distribution of the previous updates 302 may be via the distribution server 112 or may be directly from the management device 102. The previous updates 302 may update the product 115 or bring the product 115 to an up-to-date or current status.

The analysis process 300 is not necessarily tied to the management process 200 described elsewhere in the present disclosure. For instance, the analysis process 300 may be conducted independent of whether there is a current or outstanding bulletin related to the products 115. Additionally or alternatively, the analysis process 300 may be performed concurrently with the management process 200. For instance, the previous updates 302 may be distributed along with the subset of updates 202.

Figure 4:
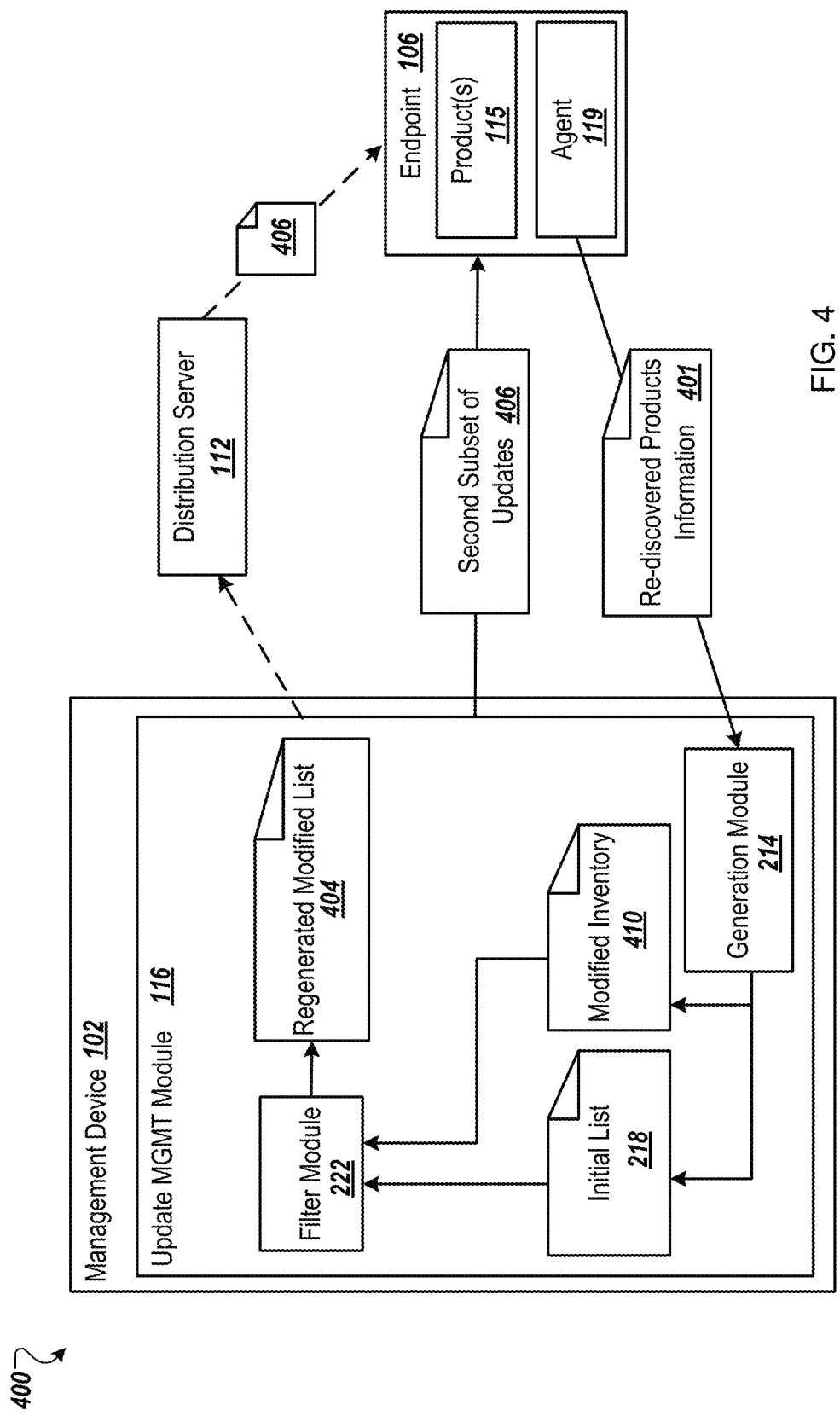
FIG. 4 depicts a block diagram of an example product inventory revision process that may be implemented in the operating environment of FIG. 1.

FIG. 4 depicts a block diagram of an example product inventory revision process (revision process) 400 that may be implemented in the operating environment of FIG. 1 or another suitable environment. The revision process 400 of FIG. 4 may include one or more components (102, 106, 111, 112, 115, 116, 119, 222, and 214) described with reference to FIGS. 1 and 2. Although not depicted in FIG. 4, communication in the revision process 400 may be via a network such as the network 120 of FIG. 1.

The revision process 400 may be performed to maintain current inventories of products 115 at endpoints 106. Additionally, the revision process 400 may be performed to ensure the products 115 at the endpoints 106 are in an up-to-date status and to ensure that updates being distributed to the endpoints 106 do not include unnecessary product updates.

The revision process 400 may begin by the update management module 116 re-discovering the products 115 at the endpoint 106. The re-discovery operation may be substantially similar to the discovery operation described elsewhere in the present disclosure. For instance, the update management module 116 may communicate with the agent 119. The agent 119 may communicate re-discovered product information 401 related to the products 115 loaded on the endpoint 106.

In some circumstances, the re-discovered product information 401 may indicate that there is a change in the products 115 at the endpoint 106. For instance, the re-discovered product information 401 might be compared with product information (e.g., 204 of FIG. 2) previously obtained from the endpoint 106 or a previous endpoint-specific inventory 216. Responsive to a change in the products 115 at the endpoint 106, the generation module 214 may generate a modified endpoint-specific inventory (hereinafter, "modified inventory") 410 that reflects the change.

The change may include an additional product (or a new version of an existing product) or a removed product. Responsive to the change including the additional product, the update management module 116 may perform the analysis process 300 relative to the additional product. For instance, the update management module 116 may determine the status of the additional product and distribute any previous product updates identified from the update catalog 111 as not being implemented in the additional product.

Responsive to the change in the products including a removed product, the update management module 116 may use the modified inventory 410 to further filter one or more product updates from the initial update list 218. For instance, the modified inventory 410 may be used to identify one or more additional unnecessary product updates. In particular, the modified inventory 410 may be used to identify outstanding product updates that relate to the removed product. Accordingly, in FIG. 4, the modified inventory 410 may be communicated to the filter module 222. The filter module 222 may be configured to perform a regeneration operation based on the modified inventory 410. The regeneration operation may be configured to produce a regenerated modified update list 404 based on the modified inventory 410. The regenerated modified update list 404 additionally filters outstanding product updates related to the removed product. The update management module 116 may be configured to distribute a second subset of updates 406. The second subset of updates 406 may be communicated to the endpoint 106 directly or via the distribution server 112. The second subset of updates 406 does not include product updates related to the removed product.

In circumstances in which a product has been removed and another added, the second subset of updates 406 may omit product updates related to the removed product and may also include previous product updates related to the additional product. Moreover, although described separately the revision process 400 of FIG. 4, the analysis process 300 of FIG. 3, and the management process 200 of FIG. 2 may occur concurrently. For instance, the previous updates 302 of FIG. 3, the second subset of updates 406, the subset of updates 202 or some combination may be determined and communicated to the endpoint 106 or the distribution server 112. Additionally, the revision process 400, the analysis process 300, and the management process 200 may be performed on an ongoing basis or regularly as part of an endpoint management process.

Figure 5:
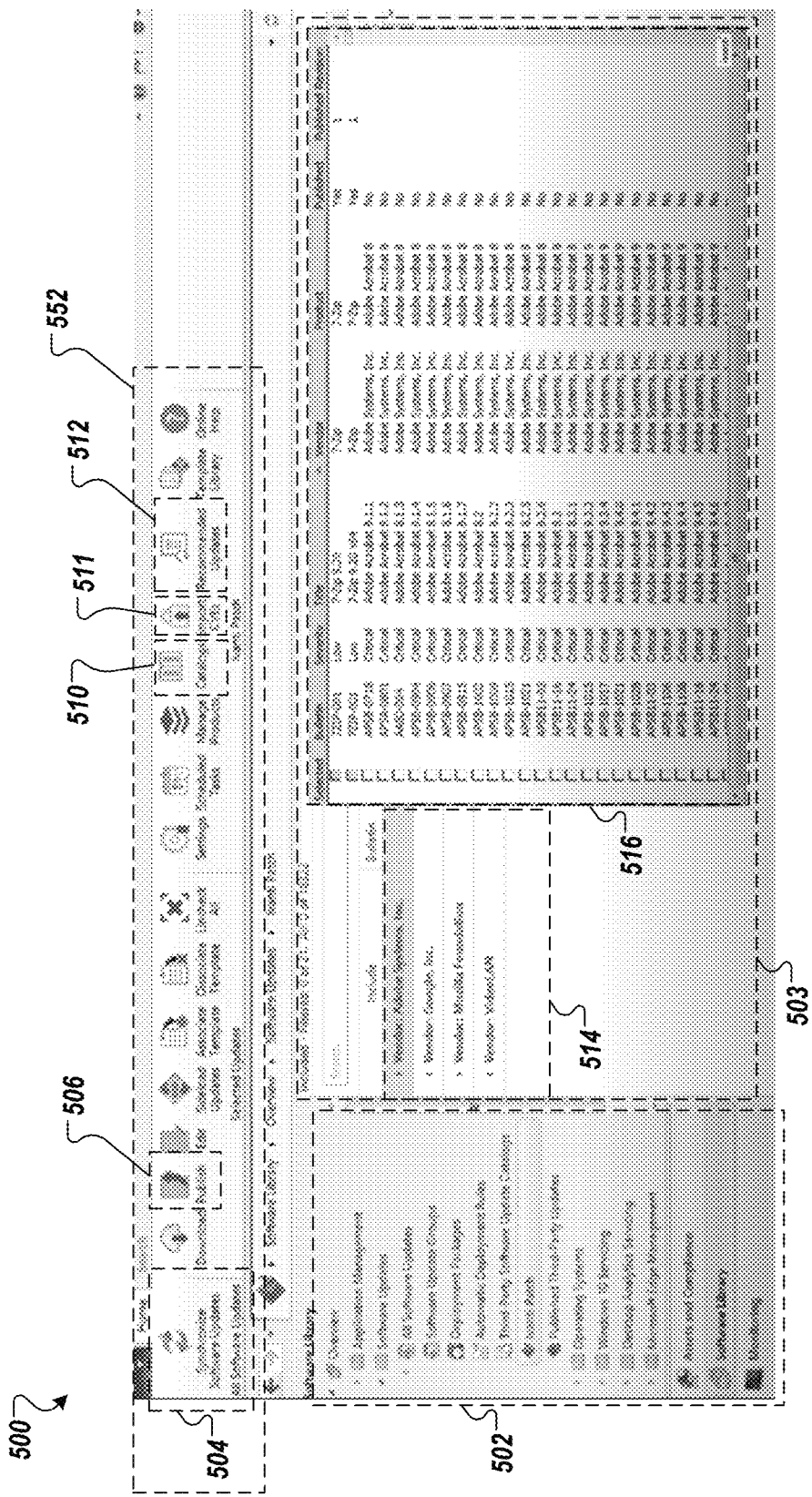
FIG. 5 depicts a screenshot of an example user interface that may be implemented on a device implementing one or more of the processes of FIGS. 3, 4, and 5.

FIG. 5 is a screenshot of an example user interface 500 that may be implemented in the operating environment 100 of FIG. 1 or another suitable operating environment. The user interface 500 of FIG. 5 is an endpoint management user interface that includes patch or product update management functionality. The user interface 500 may be implemented in a managed network to assist in management of product updates of endpoints. For instance, the user interface 500 may be implemented in the managed network 110 described with reference to FIGS. 1 and 2.

The user interface 500 may be displayed to an administrator such as the administrator 108 of FIGS. 1 and 2. The user interface 500 may display data and information to the administrator and receive user input (e.g., 228 of FIG. 2) from the administrator, which may determine operations implemented relative to managed endpoints.

As mentioned above, the user interface 500 may be used by an endpoint management system. The endpoint management system may have several functions in addition to product update management and may include two or more application services implemented in endpoint management operations. Accordingly, the user interface 500 may include a library portion 502. The library portion 502 enables selection of an icon related to a product update management system. In the embodiment of FIG. 5, the product update management system is referred to as IVANTI® Patch.

Selection of the product update management system in the library portion 502 may change information displayed on a central portion 503 of the user interface 500. In the screenshot of FIG. 5, some information is provided regarding outstanding product updates. For instance, vendor information is displayed on a left side 514 of the central portion 503. On a right side 516 of the central portion 503 a list of outstanding product updates is displayed. The list of outstanding product updates may include product updates and/or information related to the product updates. The list of outstanding product updates may be included in an update list such as the initial update list 218 described with reference to FIGS. 1 and 2.

The user interface 500 also includes a set of buttons 552. The set of buttons 552 include a synchronize button 504, a publish button 506, a catalog button 510, an import CVEs button 511, and a recommended update button 512. Selection of the synchronize button 504 and/or the publish button 506 by the administrator is an example of user input manually distributing or implementing product updates to the endpoints. For instance, in a management system implementing the user interface 500, selection of the publish button 506 may communicate the product updates (e.g., the subset of updates 202) to a distribution server (e.g., the distribution server 112). Selection of the synchronize button 504 may ensure that data on the management system and distribution server match and are prepared for deployment to endpoints. In other embodiments, other or additional operations may be implemented to distribute product updates to endpoints.

Selection of the catalog button 510 may enable visibility of an update catalog (e.g., the update catalog 111 of FIGS. 1 and 2) or may enable a download of current version of the update catalog or of recently published information related to the update catalog. Selection of the import CVEs button 511 may cause import of CVEs from a third-party server or another suitable source. The information of the CVEs may be used to generate an initial update list as described above. Accordingly, selection of the import CVEs button 511 may be used to create the list of outstanding product updates from bulletins, CVEs, etc. that is depicted on the right side 516 of the central portion 503. In some embodiments, the user interface 500 might include an "import IAVA button" or another button that is used to import information related to public vulnerabilities.

Selection of the recommended updates button 512 may initiate some operations described in FIGS. 1-4. For instance, selection of the recommend updates button 512 may initiate discovery of product inventories from endpoints and enable filter of outstanding product updates based on the discovered products. A result of selection of the recommend updates button 512 in some embodiments is described with reference to FIG. 6.

FIG. 6 is a block diagram of an example recommended update user interface (recommendation interface) 600 that may be implemented in the operating environment 100 or another suitable operating environment. The recommendation interface 600 may be configured to display products on endpoints, recommended product updates related to the products, and enable application of a filter operation. The recommendation interface 600 may be displayed responsive to selection of a recommended updates button 512 described with reference to FIG. 5.

The recommendation interface 600 includes an upper portion 620 on which data and information related to products on one or more endpoints are displayed. In the depicted embodiment, the products are referred to as software or products. The data and information displayed in the upper portion 620 are representative information discovered on endpoints that are communicatively connected to a computing device on which the recommendation interface 600 is displayed. The upper portion 620 may be an example of an endpoint-specific inventory such as the endpoint-specific inventory 216 described elsewhere in the present disclosure.

In the depicted recommendation interface 600, information regarding the products is displayed in a table. The table may include two or more columns of data such as a product name column 676, a publisher column 678, and a version column 680. The product name column 676 displays a product name for each product on the endpoints. In the displayed recommendation interface 600, the product names are given as first product 676A, second product 676B, and third product 676C. The publisher column 678 indicates a vendor or an entity that sells or otherwise offers the product. A single publisher may sell or offer two or more of the products. The version column 680 indicates a version of the product currently loaded on the endpoints.

The recommendation interface 600 includes a lower portion 632 on which recommended updates are listed. The recommended updates in the lower portion 632 may be an example of a modified update list such as the modified update list 226 described elsewhere in the present disclosure. The recommended updates may also correspond to and may be substantially similar to product updates included in the subset of updates 202 described with reference to FIG. 2.

In the depicted recommendation interface 600, information regarding the recommended updates is displayed in a table. The table may include two or more columns of data such as a bulletin column 666, the product name column 676, and the publisher column 678, and a security column 672. The bulletin column 666 includes the name of the bulletin that includes the recommended update. The product name column 676 and the publisher column 678 are as described in the upper portion 620. The security column 672 includes information regarding a level of risk associated with the recommended update. In some circumstances, knowledge of the level of risk may influence a decision to distribute the recommended update. For instance, critical product updates might be distributed automatically while unspecified product updates may be manually distributed.

The depicted recommendation interface 600 includes a "create smart filter" button 674. The button 674 allows the administrator to refine or filter the recommended updates based on one or more criteria. For instance, the recommended updates displayed in the lower portion 632 may be a result of a filter based on a presence of a corresponding product on the endpoint. That is, for a first bulletin to be included in the recommended updates, the first program to which it applies must be included on the endpoints. Additional filters are possible, for instance, the bulletins may be filtered based on products, publisher, security/risk level, version, other criteria, or combinations thereof.

Figure 7:
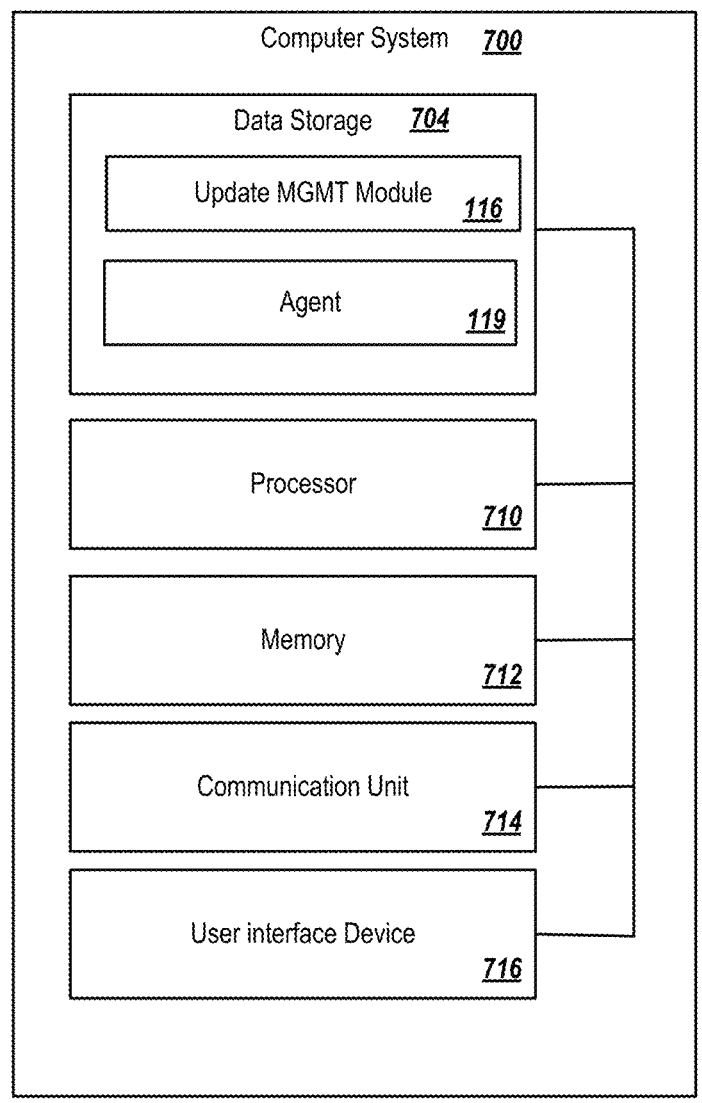
FIG. 7 illustrates an example computer system configured for automated software management.

FIG. 7 illustrates an example computer system 700 configured for automated software management, according to at least one embodiment of the present disclosure. The computer system 700 may be implemented in the operating environment 100 FIG. 1, for instance. Examples of the computer system 700 may include the management device 102, one or more of the endpoints 106, the third-party server 104, the support device 113, the distribution server 112, or some combination thereof. The computer system 700 may include one or more processors 710, a memory 712, a communication unit 714, a user interface device 716, and a data storage 704 that includes the update management module 116 and the agent 119 (collectively, modules 116/119).

The processor 710 may include any suitable special-purpose or general-purpose computer, computing entity, or processing device including various computer hardware or software modules and may be configured to execute instructions stored on any applicable computer-readable storage media. For example, the processor 710 may include a microprocessor, a microcontroller, a digital signal processor (DSP), an ASIC, an FPGA, or any other digital or analog circuitry configured to interpret and/or to execute program instructions and/or to process data. Although illustrated as a single processor in FIG. 7, the processor 710 may more generally include any number of processors configured to perform individually or collectively any number of operations described in the present disclosure. Additionally, one or more of the processors 710 may be present on one or more different electronic devices or computing systems. In some embodiments, the processor 710 may interpret and/or execute program instructions and/or process data stored in the memory 712, the data storage 704, or the memory 712 and the data storage 704. In some embodiments, the processor 710 may fetch program instructions from the data storage 704 and load the program instructions in the memory 712. After the program instructions are loaded into the memory 712, the processor 710 may execute the program instructions.

The memory 712 and the data storage 704 may include computer-readable storage media for carrying or having computer-executable instructions or data structures stored thereon. Such computer-readable storage media may include any available media that may be accessed by a general-purpose or special-purpose computer, such as the processor 710. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and that may be accessed by a general-purpose or special-purpose computer. Combinations of the above may also be included within the scope of computer-readable storage media. Computer-executable instructions may include, for example, instructions and data configured to cause the processor 710 to perform a certain operation or group of operations.

The communication unit 714 may include one or more pieces of hardware configured to receive and send communications. In some embodiments, the communication unit 714 may include one or more of an antenna, a wired port, and modulation/demodulation hardware, among other communication hardware devices. In particular, the communication unit 714 may be configured to receive a communication from outside the computer system 700 and to present the communication to the processor 710 or to send a communication from the processor 710 to another device or network (e.g., the network 120 of FIG. 1).

The user interface device 716 may include one or more pieces of hardware configured to receive input from and/or provide output to a user. In some embodiments, the user interface device 716 may include one or more of a speaker, a microphone, a display, a keyboard, a touch screen, or a holographic projection, among other hardware devices.

The modules 116/119 may include program instructions stored in the data storage 704. The processor 710 may be configured to load the modules 116/119 into the memory 712 and execute the modules 116/119. Alternatively, the processor 710 may execute the modules 116/119 line-by-line from the data storage 704 without loading them into the memory 712. When executing the modules 116/119, the processor 710 may be configured to perform one or more processes or operations described elsewhere in this disclosure.

Modifications, additions, or omissions may be made to the computer system 700 without departing from the scope of the present disclosure. For example, in some embodiments, the computer system 700 may not include the user interface device 716. In some embodiments, the different components of the computer system 700 may be physically separate and may be communicatively coupled via any suitable mechanism. For example, the data storage 704 may be part of a storage device that is separate from a device, which includes the processor 710, the memory 712, and the communication unit 714, that is communicatively coupled to the storage device. The embodiments described herein may include the use of a special-purpose or general-purpose computer including various computer hardware or software modules, as discussed in greater detail below.

Figure 8A:
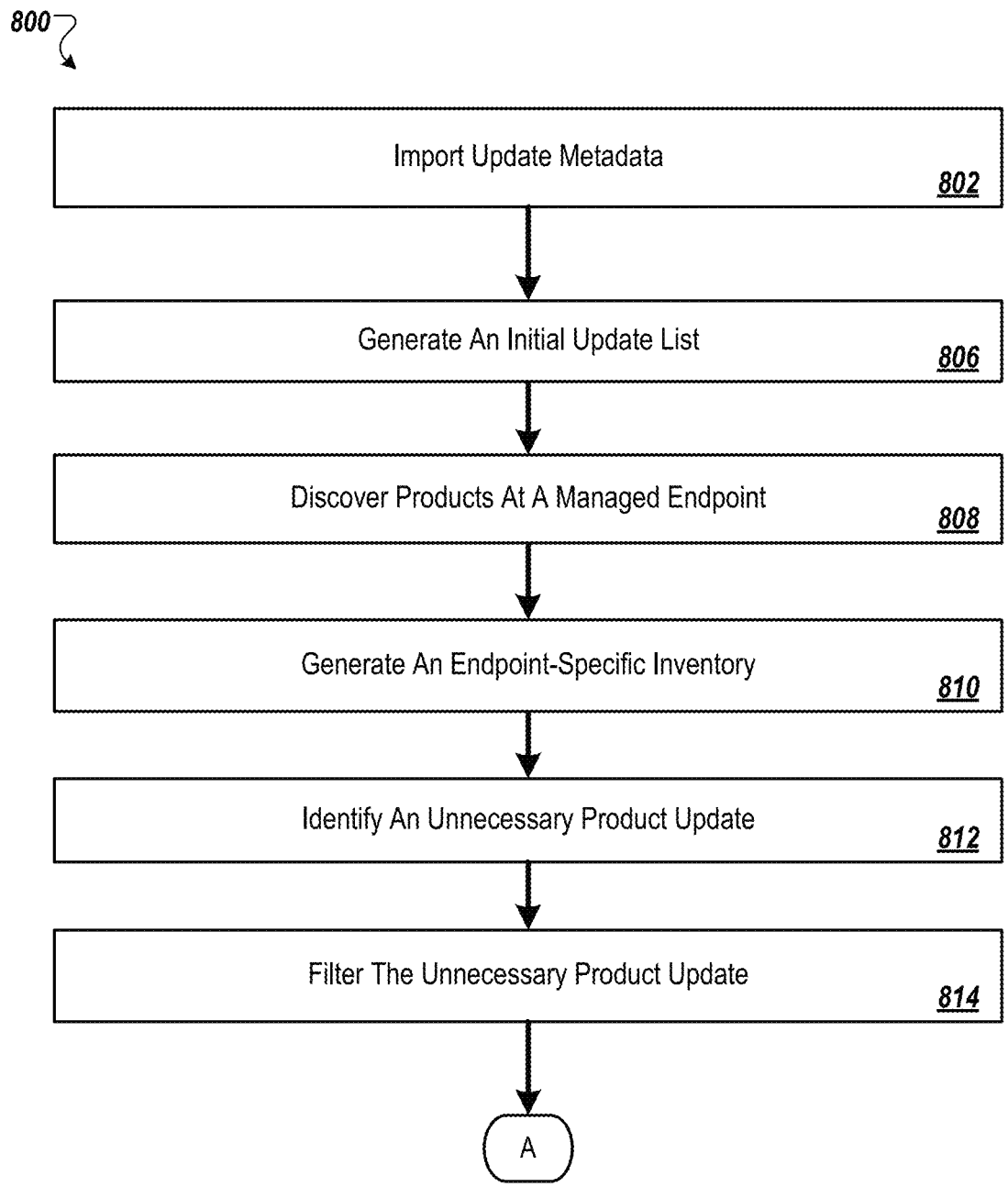
FIGS. 8A-8C are a flow chart of an example method of automated software management, all according to at least one embodiment described in the present disclosure.
Figure 8B:
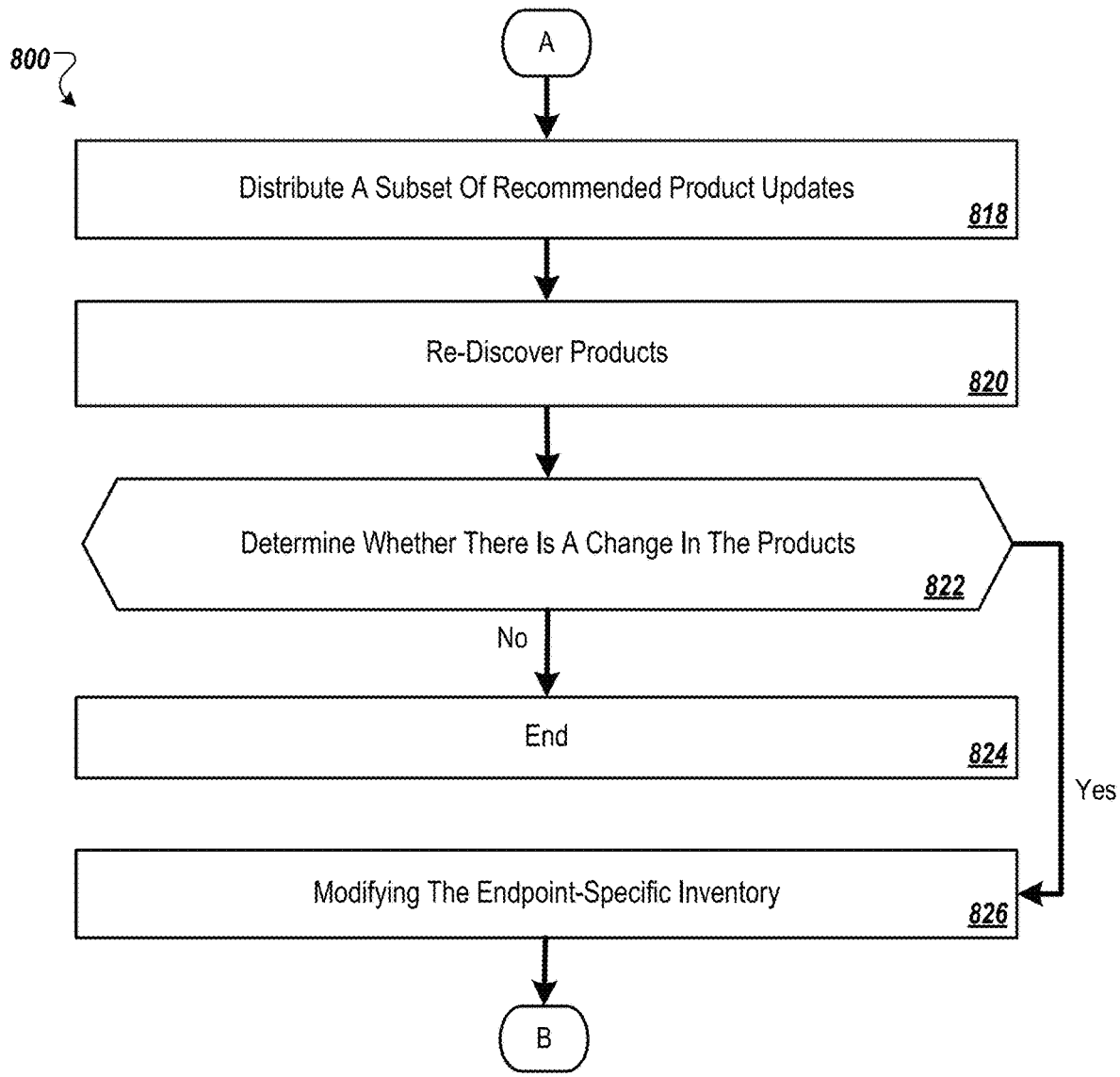
Figure 8C:
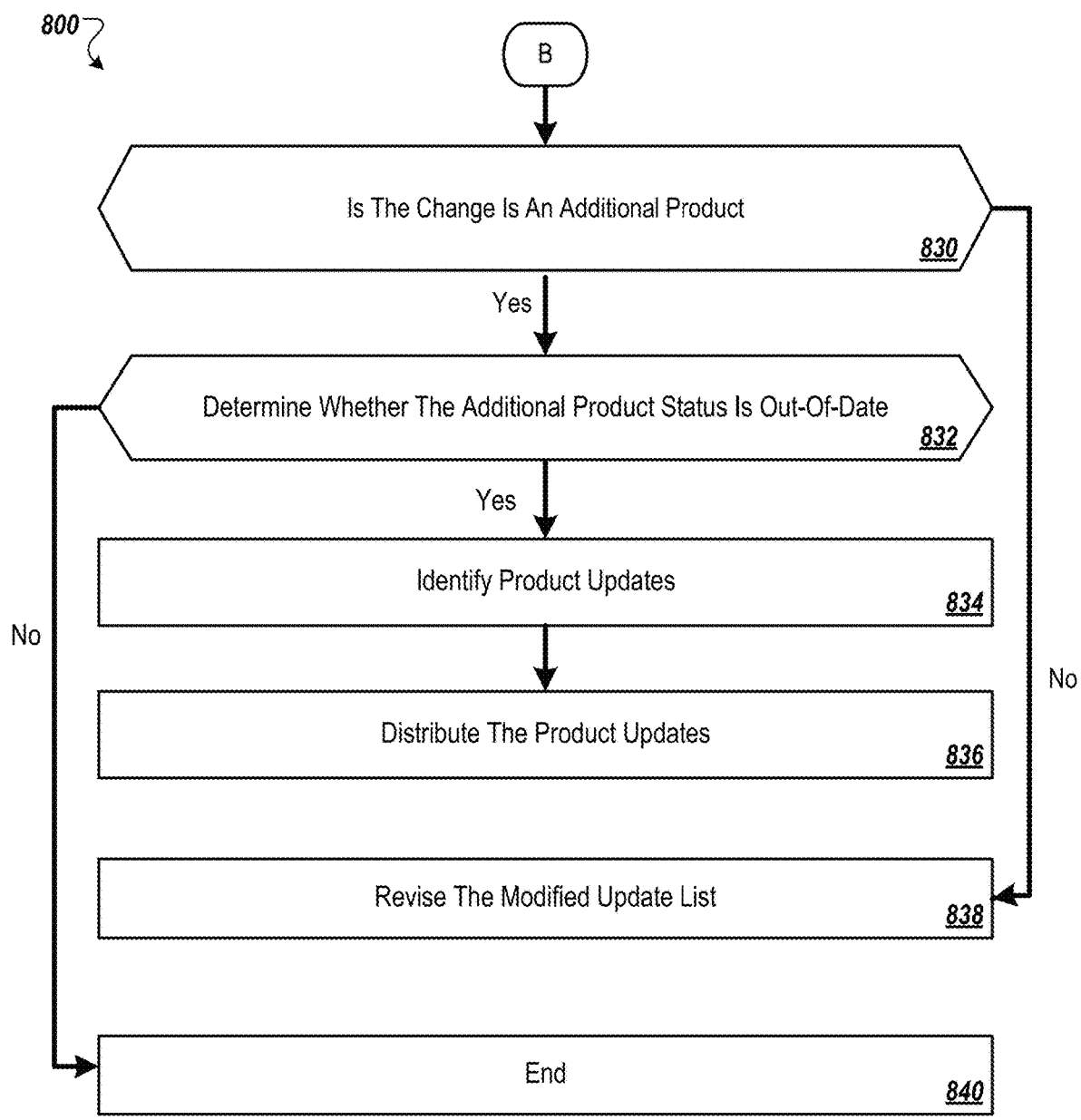

FIGS. 8A-8C are a flow chart of an example method 800 of automated software management, according to at least one embodiment of the present disclosure. As described elsewhere in the present disclosure, the method 800 may involve or may be based on metadata imported from update lists and product inventories of managed endpoints. The method 800 may be performed in a suitable operating environment such as the operating environment 100 or the managed network 110 of FIG. 1. The method 800 may be performed by the management device 102 described elsewhere in the present disclosure or by another suitable computing system, such as the computer system 700 of FIG. 7. In some embodiments, the management device 102 or the other computing system may include or may be communicatively coupled to a non-transitory computer-readable medium (e.g., the memory 712 of FIG. 7) having stored thereon programming code or instructions that are executable by one or more processors (such as the processor 710 of FIG. 7) to cause a computing system or the management device 102 to perform or control performance of the method 800. Additionally or alternatively, the management device 102 may include the processor 710 that is configured to execute computer instructions to cause the management device 102 or another computing systems to perform or control performance of the method 800. The management device 102 or the computer system 700 implementing the method 800 may be included in a cloud-based managed network, an on-premises system, or another suitable network computing environment. Although illustrated as discrete blocks, one or more blocks in FIGS. 8A-8C may be divided into additional blocks, combined into fewer blocks, or eliminated, depending on the desired implementation.

Referring to FIG. 8A, the method 800 may begin at block 802, in which update metadata may be imported. The update metadata may be consumed from an update list. The update list may include information related to cybersecurity, patches, updated application versions, or combinations thereof. For instance, the update list may include a publicly available list of cybersecurity vulnerabilities and product updates. The update list may include data and metadata related to one or more of the cybersecurity vulnerabilities and product updates. For instance, the update list may include an identification number, a description, a public reference, a link to a patch or update, or some combination thereof for at least some of the cybersecurity vulnerabilities and product updates.

The update metadata may be consumed by operations performed at a support device. For instance, update metadata may include appending or adding the update metadata to an update catalog. The update catalog may include records information associated with previous product updates and/or previous cybersecurity vulnerabilities.

At block 806, an initial update list may be generated. The initial update list may be based on the imported update metadata and/or other information related to the update list or the update catalog. The initial update list may include multiple outstanding product updates for one or more endpoints included in a managed network. The outstanding product updates might include new versions of products, patches, code changes, configuration modifications, combinations thereof, or other suitable product updates that may be implemented by the endpoints to modify a code or a setting of the product.

In some embodiments, generation of the initial update list may be based at least partially on information imported from CVEs, IAVAs, or other published vulnerability information. Products that are related to the vulnerability information may be identified. The identified products may be used to review or search product updates in update catalog. Product updates associated with the identified products may be used to generate or supplement the initial update list.

At block 808, products at a managed endpoint may be discovered. The managed endpoint may be one of the multiple endpoints included in the managed network. In some embodiments, the discovering the products at the managed endpoint may include receiving product metadata or other information related to the products from an agent. The agent may be at least temporarily loaded on the managed endpoint. At block 810, an endpoint-specific inventory may be generated. The endpoint-specific inventory may be generated based on the product metadata of the discovered products. The endpoint-specific inventory may be indicative of the products loaded on the managed endpoint.

At block 812, an unnecessary product update may be identified. The unnecessary product update may include one of the outstanding product updates that is not be related to at least one of the discovered products. At block 814, the unnecessary product update may be filtered. The unnecessary product update may be filtered from the initial update list. Filtering the unnecessary product update from the initial update list may remove the identified unnecessary product update from the initial update list. In some embodiments, the filtering involves a comparison between the update metadata associated consumed information and the product metadata of the endpoint-specific inventory. Filtering the unnecessary product update may result in generation of a modified update list. The modified update list may include a subset of outstanding product updates of the initial update list and omit the filtered unnecessary product update.

Referring to FIG. 8B, at block 818, the subset of outstanding product updates may be distributed. For instance, only the subset of the outstanding product updates may be distributed of the modified update list. The filtered unnecessary product update may not be distributed to the managed endpoint. Accordingly, the managed endpoint may not receive product updates that are not related to the products currently loaded on the managed endpoint.

Distribution of the subset of outstanding product updates may enable the product updates to be incorporated into or loaded in the products on the managed endpoint. The incorporation of the product updates modifies the products such that the managed endpoint operates in a different way following incorporation.

In some embodiments, the method 800 may include causing display of the modified update list in a user interface. User input may be received at the user interface. The user input may be sufficient to publish the subset of outstanding product updates to a distribution server. In these and other embodiments, the distributing the subset of outstanding product updates of block 818 may be responsive to the managed endpoint accessing the published product updates at the distribution server. In some embodiments, the distributing of block 818 occurs automatically such as according to a schedule or patch policy. Additionally, in some embodiments, the distributing of block 818 may be both responsive to received user input and automatically. For instance, an administrator may establish an automatic distribution process that occurs according to a schedule or patch policy. In addition, the administrator may review one or more of the outstanding product updates and provide user input suitable to initiate distribution or publication of one or more of the outstanding product updates.

In some embodiments, the method 800 may proceed to block 820 following block 818. For example, following distribution of the subset of outstanding product updates, the managed network may incorporate a new product or policy regarding the endpoints. In these circumstances, the updated or change may prompt execution of block 820.

At block 820, products of the managed endpoint may be rediscovered. Rediscovery of the products may be substantially similar to the discovery of block 808. At block 822 it may be determined whether there is a change in the products. In some embodiments, metadata communicated during a rediscovery operation of block 820 may be compared against the discovery operation of block 808. In these and other embodiments, the rediscovering products may be performed according to a defined schedule or may be initiated by a user input.

Responsive to there not being a change in the products at the managed endpoint ("No" at block 822), the method 800 may proceed to block 824 where the method 800 may end. Responsive to there being a change in the products at the managed endpoint ("Yes" at block 822), the method 800 may proceed to block 826. At block 826, the endpoint-specific inventory may be modified.

Referring to FIG. 8C, at block 830, it may be determined whether the change is an additional product. For instance, it may be determined whether the managed endpoint has added another product (e.g., downloaded another software application). Responsive to the change in the products including an additional product ("Yes" at block 830), the method 800 may proceed to block 832. Responsive to the change in the products including a removed product ("No" at block 830), the method 800 may proceed to block 838.

At block 832, it may be determined whether the additional product status is out-of-date. In some embodiments, the status of the additional product may be based on the update catalog. For example, a version of the additional product may be checked against the update catalog. Responsive to the version of the additional product not corresponding to the latest version in the update catalog, it may be determined that the additional product is out-of-date. Responsive to the status of the additional product being out-of-date ("Yes" at block 832), the method 800 may proceed to block 834. Responsive to the status of the additional product being current ("No" at block 832), the method 800 may proceed to block 840 where the method 800 may end.

At block 834, a previous product update may be identified. The previous product updates may be identified that has not been implemented in the additional product. The previous product update may be identified from the update catalog in some embodiments. At block 836, the previous product update may be distributed. The previous product update may be distributed to the managed endpoint. The identified product update may be loaded at the managed endpoint to bring the additional product into an up-to-date status. In some circumstances, multiple previous product updates may be identified from the update catalog. For instance, the additional product may not have implemented two or three previous product updates. Accordingly, the multiple previous product updates may be identified and distributed to the managed endpoint.

At block 838, the modified update list may be revised. The modified update list may be revised to filter additional outstanding product updates related to removed product. Following removal of the unnecessary product updates, product updates related to the removed products are no longer distributed to the managed endpoint.

Operations of one or more of blocks 832, 834, 836, or some combination thereof may be relative to one or more of the products on the managed endpoint. For instance, the method 800 may include determining whether a first product of the discovered products is out-of-date. This operation is similar to the operation of block 832. The determination of a status of the first product may be based on the update catalog as described elsewhere in the present disclosure. Relative to the first product, the method 800 may include identifying one or more product updates related to the first product that have not been installed at the managed endpoint. This operation is similar to the operation of 834. The one or more product updates may be identified from the update catalog. The method 800 may further include distributing the identified product updates to the managed endpoint to update the first product. This operation is similar to the operation of block 836.

In some embodiments, the method 800 may be performed in managed networks that include multiple managed endpoints. In embodiments having managed networks that include multiple managed endpoints, the managed endpoint may be a first managed endpoint, the endpoint-specific inventory may be a first endpoint-specific inventory, the modified update list may be a first modified update list, the unnecessary product update may be a first unnecessary product update, and the subset of outstanding product updates may be a first subset of outstanding product updates. In these and other embodiments the method 800 may proceed through one or more of blocks 802, 806, 808, 810, 812, 814, 816, 818, 820, 822, 824, 826, 830, 832, 834, 836, 838, 840, or combinations thereof. For instance, the method 800 may include discovering products at a second managed endpoint and generating a second endpoint-specific inventory based on discovered products at the second managed endpoint. The method 800 may include generating a second endpoint-specific inventory that includes the products loaded on the second managed endpoint and identifying a second unnecessary product update that is not related to one of the discovered products at the second managed endpoint. The second unnecessary product update may be filtered from the initial update list to remove the second unnecessary product update from the initial update list. The method 800 may include generating a second modified update list including a second subset of outstanding product updates and omitting the second unnecessary product update. The method 800 may then include distributing only the second subset of outstanding product updates of the second modified update list to the second managed endpoint.

Further, modifications, additions, or omissions may be made to the method 800 without departing from the scope of the present disclosure. For example, the operations of method 800 may be implemented in differing order. Furthermore, the outlined operations and actions are only provided as examples, and some of the operations and actions may be optional, combined into fewer operations and actions, or expanded into additional operations and actions without detracting from the disclosed embodiments.

The embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions may include, for example, instructions and data, which cause a general-purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

The various features illustrated in the drawings may not be drawn to scale. The illustrations presented in the present disclosure are not meant to be actual views of any particular apparatus (e.g., device, system, etc.) or method, but are representations employed to describe embodiments of the disclosure. Accordingly, the dimensions of the features may be expanded or reduced for clarity. In addition, some of the drawings may be simplified for clarity. Thus, the drawings may not depict all of the components of a given apparatus (e.g., device) or all operations of a particular method.

Terms used in the present disclosure and the claims (e.g., bodies of the appended claims) are intended as "open" terms (e.g., the term "including" should be interpreted as "including, but not limited to," the term "having" should be interpreted as "having at least," the term "includes" should be interpreted as "includes, but is not limited to," among others). Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in instances in which a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. Further, any disjunctive word or phrase presenting two or more alternative terms should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

The terms "first," "second," "third," etc., are not necessarily used to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art and are to be construed as being without limitation to such specifically recited examples and conditions. Although embodiments of the present inventions have been described in detail, it should be understood that the various changes, substitutions, and alterations could be made hereto without departing from the scope of the invention.

What is claimed:

1. A method of automated software management of a managed endpoint, the method comprising:
    importing update metadata from an update catalog that describes cybersecurity vulnerabilities and product updates;
    based on the imported update metadata, generating an initial update list that includes outstanding product updates for a managed endpoint included in a managed network;
    discovering products that are loaded on the managed endpoint;
    based on discovered products, generating an endpoint-specific inventory that includes product metadata of the products loaded on the managed endpoint;
    comparing the outstanding product updates of the initial update list with the product metadata of the endpoint-specific inventory;
    based on the comparison, identifying an unnecessary product update, the unnecessary product update including one of the outstanding product updates that is not related to at least one of the discovered products;
    filtering the unnecessary product update from the initial update list to generate a modified update list, the modified update list including a subset of the outstanding product updates and omitting the unnecessary product update; and
    distributing only the subset of the outstanding product updates of the modified update list to the managed endpoint such that the outstanding product updates are received by the managed endpoint and implemented locally on the managed endpoint to modify at least one of the discovered products.

2. The method of claim 1, wherein the discovering the products at the managed endpoint includes receiving the product metadata related to the products from an agent located on the managed endpoint.

3. The method of claim 1, wherein the imported update metadata includes past update metadata related to previously non-implemented product updates, the method further comprising:
    based on the past update metadata, determining whether a first product of the discovered products is out-of-date; and
    responsive to the first product being out-of-date:
        identifying a particular product update from the update catalog that has not been installed at the managed endpoint; and
        distributing the identified product update to the managed endpoint to update the first product.

4. The method of claim 1, further comprising:
    rediscovering products at the managed endpoint;
    determining whether there has been a change in the products at the managed endpoint; and
    responsive to a change in the products at the managed endpoint, modifying the endpoint-specific inventory.

5. The method of claim 4, further comprising responsive to the change in the products including an additional product:
    determining a status of the additional product; and
    responsive to the status of the additional product being out-of-date:
        identifying a previous product update from the update catalog that has not been implemented in the additional product; and
        distributing the product update to the managed endpoint such that the additional product is up-to-date.

6. The method of claim 4, further comprising responsive to the change in the products including a removed product, revising the modified update list to additionally filter outstanding product updates related to the removed product.

7. The method of claim 1, wherein the distributing only the subset of the outstanding product updates occurs automatically.

8. The method of claim 1, further comprising:
    causing display of the modified update list in a user interface; and
    receiving user input at the user interface sufficient to publish the subset of the outstanding product updates to a distribution server,
    wherein the distributing only the subset of the outstanding product updates is responsive to the managed endpoint accessing the published product updates at the distribution server.

9. The method of claim 1, further comprising distributing only the subset of the outstanding product updates of the modified update list to a second managed endpoint, wherein:
    the managed endpoint is a first managed endpoint; and
    the managed network includes a second managed endpoint that is grouped with the first managed endpoint based on at least one common characteristic.

10. The method of claim 1, wherein the generating the initial update list includes:
    importing vulnerability information common vulnerabilities and exposures (CVEs) or information assurance vulnerability alerts (IAVAs);
    identifying one or more products that are related to the vulnerability information;
    reviewing the update metadata to identify product updates related to the identified products; and
    appending the identified product updates to the initial update list.

11. One or more non-transitory computer-readable media having encoded thereon programming code executable by one or more processors to perform or control performance of operations to automate software management of a managed endpoint, the operations comprising:
    importing update metadata from an update catalog that describes cybersecurity vulnerabilities and product updates;
    based on the imported update metadata, generating an initial update list that includes outstanding product updates for a managed endpoint included in a managed network;
    discovering products that are loaded on the managed endpoint;
    based on discovered products, generating an endpoint-specific inventory that includes product metadata of the products loaded on the managed endpoint;

comparing the outstanding product updates of the initial update list with the product metadata of the endpoint-specific inventory;

based on the comparison, identifying an unnecessary product update, the unnecessary product update including one of the outstanding product updates that is not related to at least one of the discovered products;

filtering the unnecessary product update from the initial update list to generate a modified update list, the modified update list including a subset of the outstanding product updates and omitting the unnecessary product update; and distributing only the subset of the outstanding product updates of the modified update list to the managed endpoint such that the outstanding product updates are received by the managed endpoint and implemented locally on the managed endpoint to modify at least one of the discovered products.

12. The one or more non-transitory computer-readable media of claim 11, wherein the discovering the products at the managed endpoint includes receiving the product metadata related to the products from an agent located on the managed endpoint.

13. The one or more non-transitory computer-readable media of claim 11, wherein:
the imported update metadata includes past update metadata related to previously non-implemented product updates; and
the operations further comprise:
based on the past update metadata, determining whether a first product of the discovered products is out-of-date; and
responsive to the first product being out-of-date:
identifying a particular product update from the update catalog that has not been installed at the managed endpoint; and
distributing the identified product update to the managed endpoint to update the first product.

14. The one or more non-transitory computer-readable media of claim 11, wherein the operations further comprise:
rediscovering products at the managed endpoint;
determining whether there has been a change in the products at the managed endpoint; and
responsive to a change in the products at the managed endpoint, modifying the endpoint-specific inventory.

15. The one or more non-transitory computer-readable media of claim 14, wherein the operations further comprise responsive to the change in the products including an additional product:
determining a status of the additional product; and
responsive to the status of the additional product being out-of-date:
identifying a previous product update from the update catalog that has not been implemented in the additional product; and
distributing the product update to the managed endpoint such that the additional product is up-to-date.

16. The one or more non-transitory computer-readable media of claim 14, wherein the operations further comprise responsive to the change in the products including a removed product, revising the modified update list to additionally filter outstanding product updates related to the removed product.

17. The one or more non-transitory computer-readable media of claim 11, wherein the distributing only the subset of the outstanding product updates occurs automatically.

18. The one or more non-transitory computer-readable media of claim 11, wherein the operations further comprise:
causing display of the modified update list in a user interface; and
receiving user input at the user interface sufficient to publish the subset of the outstanding product updates to a distribution server,
wherein the distributing only the subset of the outstanding product updates is responsive to the managed endpoint accessing the published product updates at the distribution server.

19. The one or more non-transitory computer-readable media of claim 11, wherein:
the operations further comprise distributing only the subset of the outstanding product updates of the modified update list to a second managed endpoint;
the managed endpoint is a first managed endpoint; and
the managed network includes a second managed endpoint that is grouped with the first managed endpoint based on at least one common characteristic.

20. The one or more non-transitory computer-readable media of claim 11, wherein the generating the initial update list includes:
importing vulnerability information common vulnerabilities and exposures (CVEs) or information assurance vulnerability alerts (IAVAs);
identifying one or more products that are related to the vulnerability information;
reviewing the update metadata to identify product updates related to the identified products; and
appending the identified product updates to the initial update list.

* * * * *